(12) United States Patent
Skog et al.

(10) Patent No.: US 9,985,915 B2
(45) Date of Patent: May 29, 2018

(54) DIVIDED MULITMEDIA MESSAGING DELIVERY

(75) Inventors: Robert Skog, Hässelby (SE); Joakim Movander, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 561 days.

(21) Appl. No.: 14/357,989

(22) PCT Filed: Nov. 17, 2011

(86) PCT No.: PCT/SE2011/051383
§ 371 (c)(1),
(2), (4) Date: May 13, 2014

(87) PCT Pub. No.: WO2013/074006
PCT Pub. Date: May 23, 2013

(65) Prior Publication Data
US 2014/0289352 A1    Sep. 25, 2014

(51) Int. Cl.
G06F 15/16  (2006.01)
H04L 12/58  (2006.01)
H04L 29/08  (2006.01)

(52) U.S. Cl.
CPC .......... H04L 51/10 (2013.01); H04L 51/063 (2013.01); H04L 51/066 (2013.01); H04L 51/24 (2013.01); H04L 67/06 (2013.01); H04L 51/38 (2013.01)

(58) Field of Classification Search
CPC . H04L 51/066; H04L 51/063; H04L 12/5835; H04L 51/10; H04M 1/72547
See application file for complete search history.

(56) References Cited

U.S. PATENT DOCUMENTS

| 8,095,116 B2 * | 1/2012 | Hundscheidt .......... H04L 12/58 379/88.13 |
| 2003/0093520 A1 * | 5/2003 | Beesley .................. H04L 12/14 709/224 |

(Continued)

FOREIGN PATENT DOCUMENTS

| EP | 1107618 A2 | 6/2001 |
| EP | 1248422 A1 | 10/2002 |

(Continued)

OTHER PUBLICATIONS

OMA, "MMS Architecture", Open Mobile Alliance, OMA-AD-MMS-V1_3-20080128-C, 2008, 1-26.
OMA, "Multimedia Messaging Service Client Transactions", Open Mobile Alliance, OMA-TS-MMS-CTR-V1_3-20110511-C, May 11, 2011, 1-64.

(Continued)

Primary Examiner — Tauqir Hussain
Assistant Examiner — Austin Moreau
(74) Attorney, Agent, or Firm — Patent Portfolio Builders, PLLC (57) ABSTRACT

Method and apparatus for sending a large Multimedia Message, such as a MMS from a first terminal (10) to at least one second terminal (14) via a first network node (12) comprised in a communication network. The first network node (12) receives (30) the Multimedia Message from the first terminal (10) and divides (31) the Multimedia Message into a first part and at least one additional part. Next the first network node (12) adds (32) to the first part a reference to the at least one additional part and sends (33) the first part to the at least one second terminal (14). The first network node (12) then sends (34) the at least one additional part to the at least one second terminal (14) when requested by the at least one second terminal.

26 Claims, 8 Drawing Sheets

(56) References Cited

U.S. PATENT DOCUMENTS

| | | | |
|---|---|---|---|
| 2005/0054287 A1* | 3/2005 | Kim | H04L 51/38 455/3.05 |
| 2006/0176878 A1* | 8/2006 | Han | H04W 4/18 370/389 |
| 2006/0248570 A1* | 11/2006 | Witwer | H04N 5/44591 725/135 |
| 2007/0037557 A1* | 2/2007 | Shao | H04L 29/06 455/414.1 |
| 2009/0111433 A1* | 4/2009 | Muhonen | H04L 12/5895 455/414.1 |
| 2011/0138018 A1* | 6/2011 | Raveendran | H04L 65/1069 709/219 |

FOREIGN PATENT DOCUMENTS

| | | |
|---|---|---|
| KR | 100615655 B1 | 8/2006 |
| KR | 2007032301 A | 3/2007 |
| RU | 2378786 C2 | 1/2010 |
| TW | 201117599 A | 5/2011 |
| WO | 2006050751 A1 | 5/2006 |
| WO | 2006136872 A1 | 12/2006 |

OTHER PUBLICATIONS

OMA, "Multimedia Messaging Service Ecapsulation Protocol", Open Mobile Alliance, OMA-TS-MMS-ENC-V1_3-20080128-C, Jan. 28, 2008, 1-121.

* cited by examiner

DIVIDED MULITMEDIA MESSAGING DELIVERY

TECHNICAL FIELD

The present invention relates to a method in first terminal for sending via a first network node a Multimedia Message, such as a MMS, to at least one second terminal, a method in a first network node for sending a Multimedia Message to at least one second terminal and a method in a second terminal for receiving a Multimedia Message. The invention also relates to a first terminal, a first network node and a second terminal.

BACKGROUND

The Multimedia Messaging Services (MMS), as its name implies, is intended to provide a rich set of content to subscribers in a messaging context. It supports both sending and receiving of such messages by properly enabled client devices.

The multimedia messaging protocol data units (PDUs) consists of MMS headers and a message body. The message body may contain any content type such as text, image, audio and video.

Different content types can be encapsulated into a single message, e.g. the message body of the MMS may contain both text and image as content. It is also possible to specify how the content should be rendered to the display and speakers on the terminal.

Smart phones are becoming more and more popular as they are equipped with cameras, video recording possibilities and higher bandwidth capabilities. Today, MMS is considered as an easy and convenient service and the end users may find this service as attractive to use when sending large amounts of data, e.g. large video files.

However, the communication network may get overloaded if a majority of end users starts sending large MMS files to each other. Therefore, the MMS client in the terminal has restricted the end user from sending large MMS files.

Thus, there is no limitation in the technology for allowing end users to send large MMS files but it is a problem to enable end users to send files of arbitrary size while controlling the resources used in the communication network.

SUMMARY

It is an object of the embodiments described hereinafter to address at least some of the issues outlined above, and this object and others are achieved by the method and the arrangement according to the appended independent claims, and by the embodiments according to the dependent claims.

According to a first exemplary aspect, embodiments provide a method in a first network node of a communication network for sending a Multimedia Message to at least one second terminal, the Multimedia Message being received from a first terminal. The method comprises dividing the Multimedia Message into a first part and at least one additional part and adding to the first part a reference to the at least one additional part. Next, the first network node sends the first part to the at least one second terminal and sends the at least one additional part to the at least one second terminal, when requested by each of the at least one second terminals.

Further, the maximum allowed size of the first part is defined in a subscription rule of the first terminal.

As an option, the dividing is preceded by receiving an alerting message from the first terminal, the alerting message indicates that the size of the Multimedia Message exceeds the maximum allowed size defined in the subscription rule of the first terminal.

As an option, the first terminal may belong to a first operator and the at least one second terminal may belong to a second operator, the first part being sent to the at least one second terminal via a second network node, the second network node belonging to the second operator.

Further, a subscription of each of the at least one second terminal is charged for the sending of the at least one additional part.

As an option, the Multimedia Message is in the format of a MMS, Multimedia Messaging Service.

According to a second exemplary aspect, embodiments provide a first network node connectable to a communication network and arranged to send a Multimedia Message to at least one second terminal. The first network node comprising a receiving circuitry configured to receive the Multimedia Message from a first terminal. The first network node further comprises a processor circuitry configured to divide the Multimedia Message into a first part and at least one additional part, and to add to the first part a reference to the at least one additional part. The first network node further comprises a transmitting circuitry configured to send the first part to the at least one second terminal, and to send the at least one additional part to the at least one second terminal, when requested by each of the at least one second terminals.

As an option, the first terminal belongs to a first operator and the at least one second terminal belongs to a second operator, and the transmitting circuitry is configured to send the first part to the at least one second terminal via a second network node, the second network belonging to the second operator.

As an option, the processing circuitry is further configured to charge a subscription of each of the at least one second terminal for the sending of the at least one additional part.

According to a third exemplary aspect, embodiments provide a method in a first terminal of a communication network for sending a Multimedia Message to at least one second terminal, the Multimedia Message being sent via a first network node. The method comprises sending an alerting message to the first network node, the message indicates that the size of the Multimedia message exceeds the maximum allowed size defined in a subscription rule of the first terminal.

According to a fourth exemplary aspect, embodiments provide a first terminal connectable to a communication network, and arranged to send a Multimedia Message to at least one second terminal, the Multimedia Message being sent via a first network node. The first terminal comprises a transmitting circuitry and a processing circuitry. The processing circuitry being configured to send an alerting message to the first network node, the alerting message indicates that the size of the Multimedia Message exceeds the maximum allowed size defined in a subscription rule of the first terminal.

According to a fifth exemplary aspect, embodiments provide a method in a second terminal of a communication network for receiving a Multimedia Message from a first terminal via a first network node. The method comprises, receiving from the first network node a first part of the Multimedia Message wherein the first part comprises a reference to an at least one additional part of the Multimedia Message. The method further comprises requesting the at least one additional part from the first network node, wherein the request comprises the reference to the at least one additional part. Next, the second terminal receives the at least one additional part.

As an option, the request further comprises the available bandwidth and the capabilities of the second terminal.

Further, a maximum allowed size of the received first part is defined in a subscription rule of the first terminal.

As an option, the first terminal may belong to a first operator and the second terminal may belong to a second operator, the second terminal receives the first part from the first network node via a second network node, the second network node belonging to the second operator.

According to a sixth exemplary aspect, embodiments provide a second terminal connectable to a communication network and arranged to receive a Multimedia Message from a first terminal via a first network node. The second terminal comprises a receiving circuitry, a transmitting circuitry, and a processing circuitry. The processing circuitry being configured to, receive, using the receiving circuitry, from the first network node a first part of the Multimedia Message, wherein the first part comprises a reference to at least one additional part of the Multimedia Message. Next, a request is sent, using the transmitting circuitry, to the at least one additional part from the first network node, wherein the request comprises the reference to the at least one additional part. Receiving, using the receiving circuitry, the at least one additional part.

As an option, the request further comprises the available bandwidth and the capabilities of the second terminal.

An advantage with the embodiments is enabling the end users to send large Multimedia Messages while controlling the resources used in the communication network.

BRIEF DESCRIPTION OF THE DRAWINGS

Exemplary embodiments of the invention will now be described in more detail, and with reference to the accompanying drawings, in which:

FIG. 6b is a schematic diagram showing functional modules of the first network node of FIG. 6a.

FIG. 7b is a schematic diagram showing functional modules of the first terminal of FIG. 7a.

FIG. 8b is a schematic diagram showing functional modules of the second terminal of FIG. 8a.

DETAILED DESCRIPTION

In the following description, the invention will be described in more detail with reference to certain embodiments and to accompanying drawings. For purposes of explanation and not limitation, specific details are set forth, such as particular scenarios, techniques, etc., in order to provide a thorough understanding of the present invention. However, it is apparent to one skilled in the art that the present invention may be practised in other embodiments that depart from these specific details.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as in a system comprising a computer processor and a memory coupled to the processor, wherein the memory is encoded with one or more programs that may perform the functions disclosed herein.

According to exemplary embodiments described herein, only a first part of an MMS from a first terminal, e.g. a large MMS, is sent to a second terminal, after dividing the MMS into a first part and at least one additional part. The at least one additional part is sent to the second terminal only after receiving a request from the second terminal.

An example of an MMS file that is considered "large" is an MMS file that exceeds the maximum allowed MMS size defined in a subscription rule of the first terminal.

Figure 1:
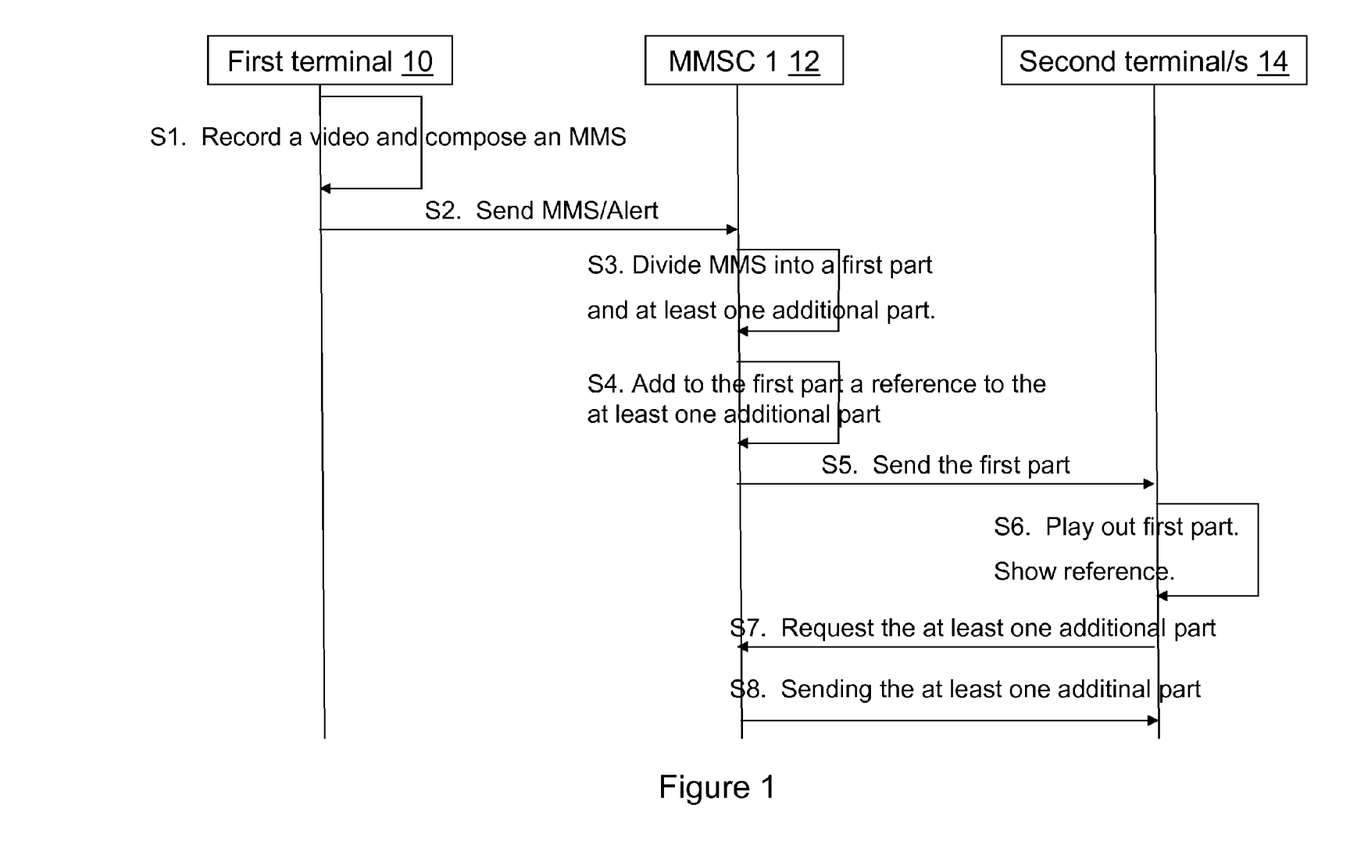
FIG. 1 schematically illustrates a first exemplary signalling diagram for providing a mechanism that allows a first terminal to send a large MMS file to at least one second terminal, the first terminal and the at least one second terminal belongs to the same operator.

FIG. 1 schematically illustrates an exemplary signalling diagram for sending a large MMS file to at least one second terminal 14. In this scenario, the first terminal 10 and the second terminal 14 belongs to the same network operator.

In this signalling diagram a first terminal 10, a first network node, e.g. a Multimedia Messaging Service Center (MMSC) 12 and at least one second terminal 14 are shown. According to the signalling diagram, the following steps occur:

Signal S1: An end user composes a large MMS file using the first terminal 10, i.e. a terminal capable of sending an MMS e.g. a video file, to at least one second terminal 14. The end user uses a conventional terminal operation to send the MMS.

Signal S2: In S2, The first terminal 10 sends via the first MMSC 12 the composed MMS intended to the at least second terminal 14. The first MMSC 12 is located in the home network of the first terminal 10 and is responsible to e.g. modify the multimedia content included in the MMS into a format suitable for the at least one second terminal 14 and to forward the MMS to the at least one second terminal 14.

Before sending the MMS, the first terminal detects that the file is large, e.g. that the MMS file to be sent exceeds the maximum allowed size defined in the first terminal's subscription rule.

The first terminal 10 therefore indicates in S2, that the MMS file is large by adding an alerting message to the MMS file.

Signal S3: In S3, the first MMSC 12 receives the MMS file as well as the alert message and detects that the MMS is large. The first MMSC 12 therefore divides the MMS into a first part and at least one additional part. The size of the first part does not exceed the maximum allowed MMS size defined in the subscription rule of the first terminal 10.

According to another embodiment, not illustrated in FIG. 1, the first network node 12 does not receive an alert message. Instead the first network node 12 is able to detect that the MMS is large since it exceeds the maximum allowed size defined in the subscription rule of the first terminal. Such information may be stored in the first network node 12 or can be requested by the first network node 12 from another node in the communication network.

Signal S4: In S4, the first MMSC 12 adds to the first part a reference to the at least one additional part. The reference comprises a link pointing to the at least one additional part.

Signal S5: In S5, the first MMSC sends to the at least one second terminal 14, the first part as well as the reference to the at least one additional part.

As mentioned above, the size of the first part sent does not exceed the maximum allowed MMS size defined in the subscription rule of the first terminal 10. Thus, at this stage the network resources between the first MMSC 12 and the second terminal/s 14 are saved since the at least one additional part has not been sent to the at least one second terminal 14.

The at least one additional part is sent only when requested by the at least one second terminal 14, as described later in connection with signal S7 and S8.

Signal S6: In S6, the at least one second terminal receives the first part of the MMS and the reference pointing to the at least one additional part. The end user of the second terminal 14 is now able to play out the first received part of the MMS and decide to download or stream the at least one additional part using the received reference. The end user is also able to refrain the at least one additional part.

Signal S7: in S7, the end user decides to get the at least one additional part using the reference.

Signal S8: In response to the user request, the first MMSC 12 sends in S8, the at least one additional part to the at least one second terminal 14.

The end user of the first terminal 10 is able to specify whether to send the large MMS to one or several second terminals 14. All specified second terminals will receive the first part of the MMS. However, It is up to the end user of each of the second terminals 14 to get the at least one additional part.

When a second terminal 14 requests the at least one additional part of the MMS, it may either download or stream the at least one additional part. In the downloading case, the play out of the at least one additional part is possible after it has been downloaded to the second terminal. Whereas in the streaming case, the second terminal can play out the at least one additional part at the same time as it gets streamed into the terminal.

The first MMSC 12 may store the at least one additional part for a predefined time, and the at least one second terminal 14 may send a request during the predefined time to download or stream the at least one additional part.

The subscription of the first terminal 10 may be charged for the first part of the MMS according to what is defined in his subscription rule. Whereas, the subscription of the second terminal 14 may be charged for the at least one additional part of the MMS. As example, a subscription of the first terminal may be charged for a one time fee for sending the MMS and the subscription of the second terminal may be charged for the number of bytes downloaded that corresponds to the at least one additional part of the MMS.

The at least one second terminal 14 may send additional information when requesting the at least one additional part. For instance, the at least one second terminal 14 can inform the first MMSC about the capabilities of the terminal and the available bandwidth. The first MMSC 12 may then send the at least one additional part based on the received parameters, e.g. the first MMSC 12 may modify the format of the at least one additional part of the MMS into a suitable format based on the at least one second terminal's capabilities. The first MMSC 12 may also adjust the transfer rate of the at least one additional part of the MMS based on the available bandwidth of the at least one second terminal 14.

Figure 2:
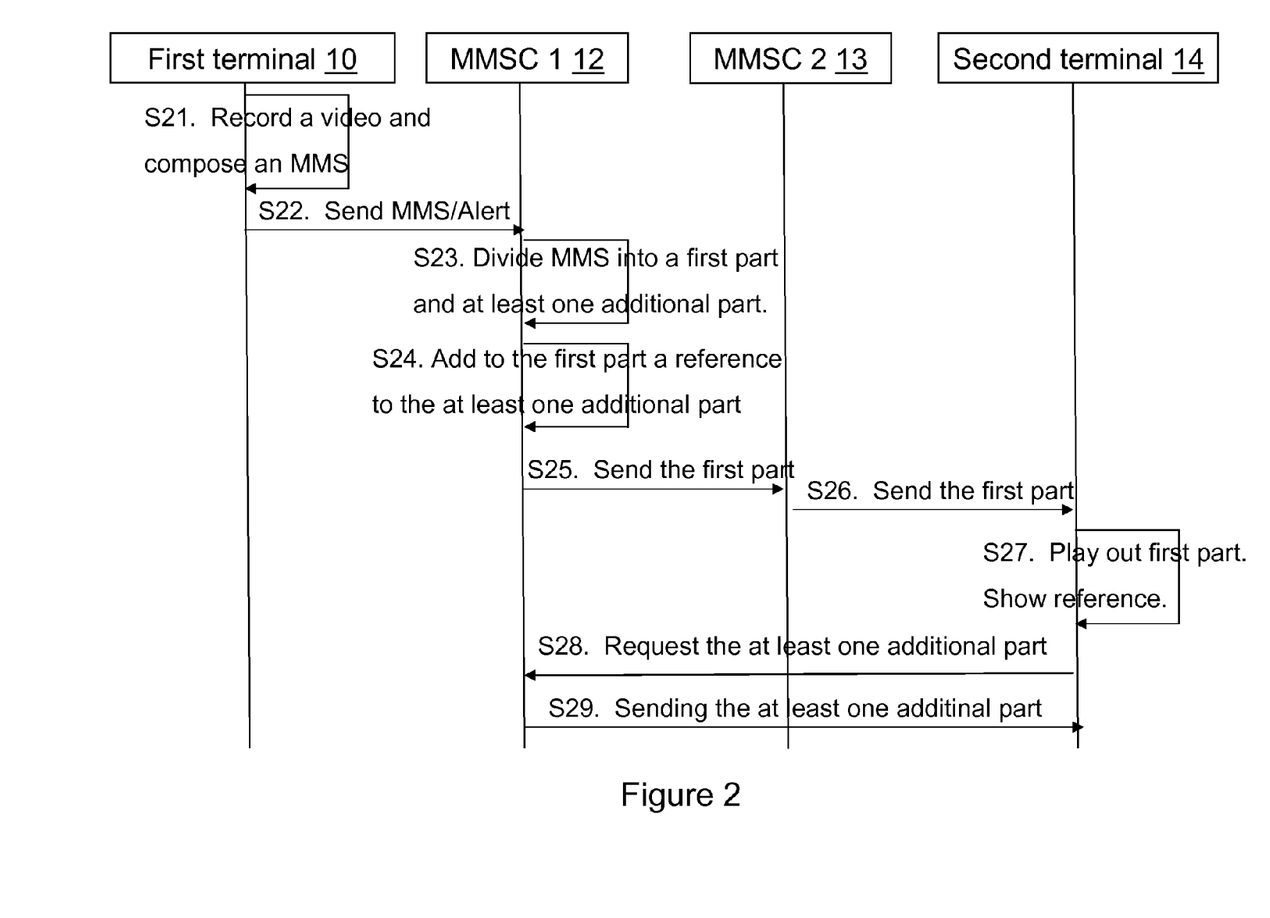
FIG. 2 schematically illustrates a second exemplary signalling diagram for providing a mechanism that allows a first terminal to send a large MMS file to at least one second terminal, the first terminal and the at least one second terminal belongs to different operators.

FIG. 2 schematically illustrates a second exemplary signalling diagram for sending a large MMS file to at least one second terminal 14. In this scenario the first terminal 10 and the at least one second terminal 14 belongs to different network operators.

In this signalling diagram a first terminal 10, a first Multimedia Messaging Service Center (MMSC) 12, a second MMSC 13 and at least one second terminal 14 are shown.

In FIG. 2, the signals S21-S23 corresponds to the signals S1-S3 in FIG. 1, i.e. the end user composes a large MMS in S1, S21. The first terminal 10 sends the MMS as well as an alert message to the first MMSC 12 in S2, S22. The first MMSC 12 detects that the MMS file is large and divides it into a first part and at least one additional part in S3, S23.

As mentioned above, in FIG. 2 the first terminal 10 and the second terminal 14 belongs to two different operators. The first operator comprises the first MMSC 12 and the second operator comprises the second MMSC 13.

Signal S24: In S24, the first MMSC 12 adds a reference to the at least one additional part of the MMS.

The added reference points to the first MMSC 12. The first MMSC 12 does not send the at least one additional part of the MMS to the second MMSC 13. Thus network resources are saved in the link between the first MMSC 12 and the second MMSC 13.

Signal S25: In S25 the first MMSC 12 sends the first part of the MMS to the at least one second terminal 14 via the second MMSC 13.

Signal S26: In S26, the second MMSC 13 forwards the received first part of the MMS to the at least one second terminal 14.

Signal S27: In S27, the at least one second terminal 14 receives the first part of the MMS and the reference pointing to the at least one additional part of the MMS stored in the first MMSC 12.

Signal S28: In S28, the second terminal 14, requests the at least one additional part of the MMS directly form the first MMSC 12 comprised in the first operator network.

Note that there is no need for the second terminal 14 to contact the second MMSC 13 when requesting the at least one additional part.

Signal S29: In response to the user request, the first MMSC 12 sends in S29, the at least one additional part to the second terminal 14.

Figure 3:
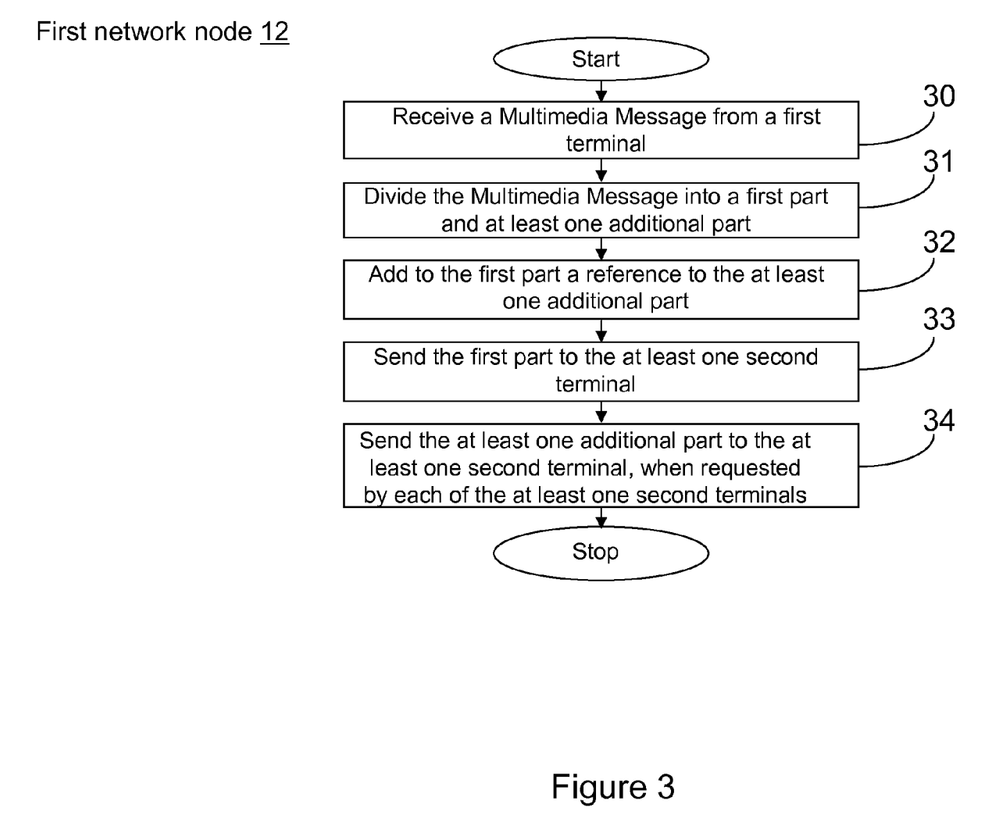
FIG. 3 is a flow diagram illustrating first exemplary embodiment of a method in a first network node for sending a large Multimedia Message to at least one second terminal.

FIG. 3 is a first flow diagram illustrating a first exemplary embodiment of a method in a first network node, e.g. the first MMSC 12 for enabling the first terminal 10 to send e.g. a large MMS file to at least one second terminal 14.

In step 30, the first network node 12 receives a Multimedia Message, e.g. a MMS from the first terminal 10. The Multimedia Message is intended to the at least one second terminal 14.

According to another embodiment, the first network node 12 receives an alert from the first terminal 10 that indicates that the Multimedia Message is large.

In step 31, the first network node 12 divides the received Multimedia Message into a first part and at least one additional part.

According to another embodiment, the size of the first part of the Multimedia Message does not exceed the maximum allowed Multimedia Message size defined in a subscription rule of the first terminal.

In step 32, the first network node 12 adds to the first part a reference to the at least one additional part. The reference may be a link to be used by the end user of the at least one second terminal 14 to request the at least one additional part from the first network node 10.

In step 33, the first network node 12 sends the first part of the Multimedia Message to the at least one second terminal.

In step 34, the first network node 12 sends the at least one additional part when requested by the at least one second terminal 14.

Figure 4:
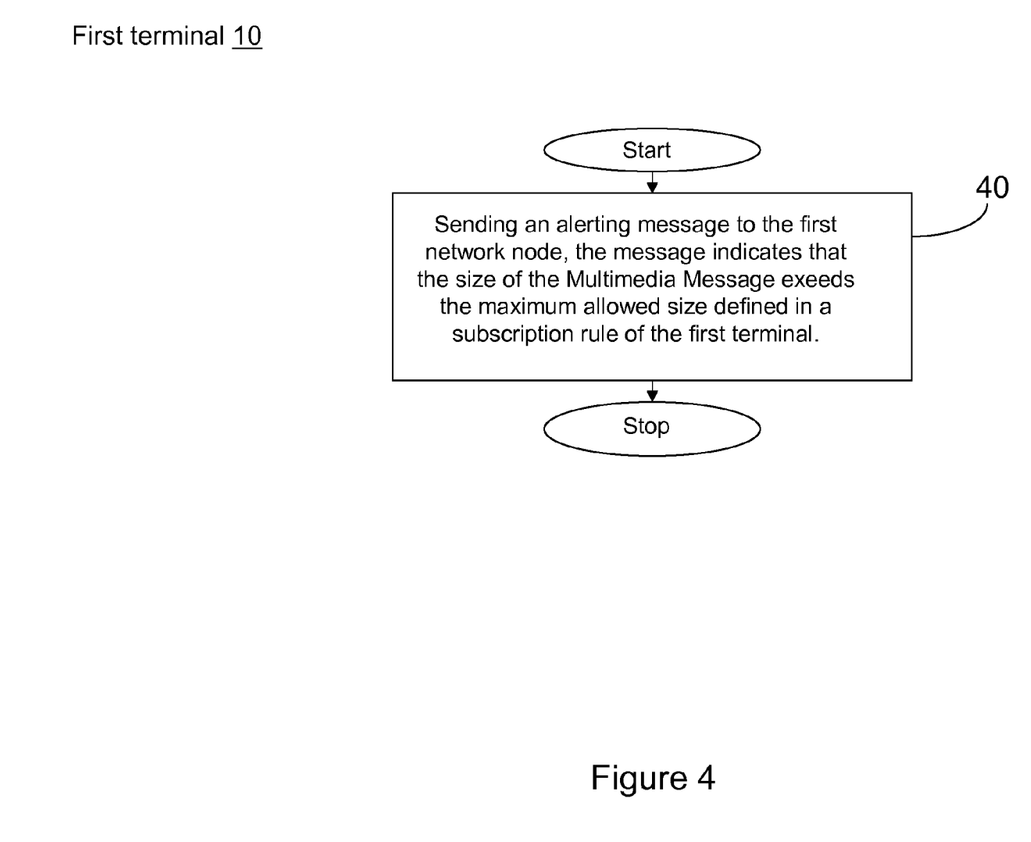
FIG. 4 is a flow diagram illustrating second exemplary embodiment of a method in a first terminal 10 for sending a large Multimedia Message and an alert message to the first network node.

FIG. 4 is a second flow diagram illustrating a second exemplary embodiment of a method in a first terminal 10 for sending a Multimedia Message e.g. a large MMS file to the at least one second terminal 14.

As previously mentioned, the first terminal is able to detect whether the Multimedia Message to be sent is considered large, e.g. by checking whether the size of the Multimedia Message exceeds the maximum allowed size defined in the end user's subscription rule.

In step 40, the first terminal detects that the size of the Multimedia Message is large and therefore sends an alerting message to the first network node, the message indicates that the size of the Multimedia Message exceeds the maximum allowed size defined in the subscription rule.

Figure 5:
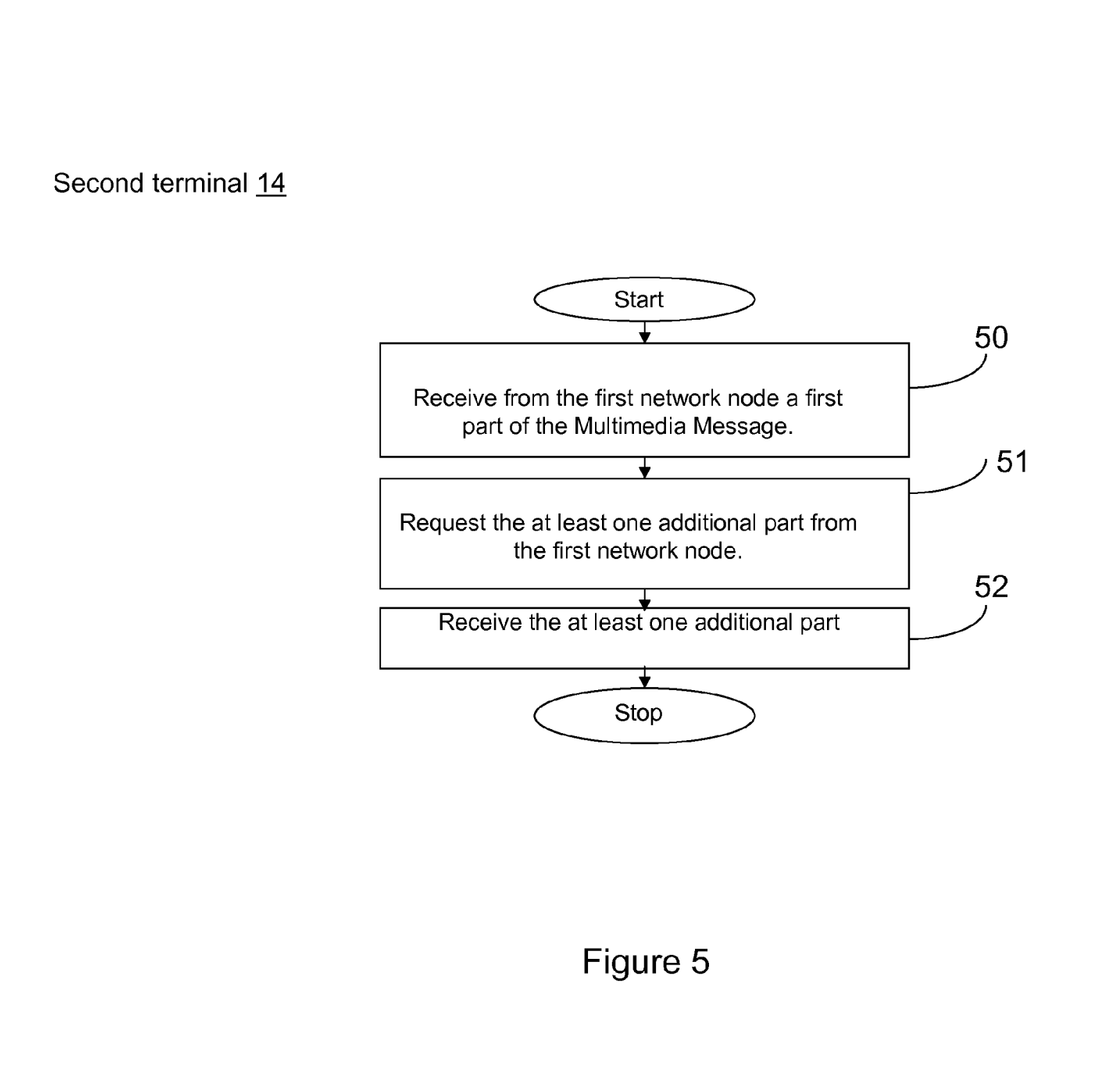
FIG. 5 is a flow diagram illustrating third exemplary embodiment of a method in a second terminal 14 for receiving a first part and at least one additional part of a large Multimedia Message.

FIG. 5 is a third flow diagram illustrating a third exemplary embodiment of a method in a second terminal 14 for receiving e.g. a large Multimedia Message from a first terminal 10.

In step 50, the second terminal 14 receives from a first network node 12, a first part of the Multimedia Message.

According to another embodiment, the received first part does not exceed the maximum allowed Multimedia Message size defined in a subscription rule of the first terminal 10.

In step 51, the terminal 14 requests the at least one additional part from the first network node.

In step 52, the second terminal 14 receives the at least one additional part of the Multimedia Message from the first network node 12.

According to an embodiment, the at least one additional terminal 14 downloads or streams the at least one additional part from the first network node 12.

According to another embodiment, the first terminal 10 belongs to a first operator and the at least one second terminal 14 belongs to a second operator. In this embodiment the at least one second terminal receives the first part from the first network node 12 via a second network node 13, the second network node 13 belongs to the second operator.

Figure 6A:
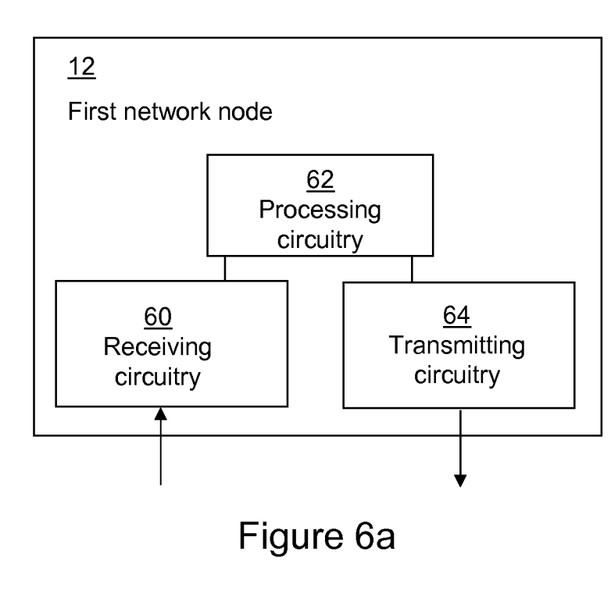
FIG. 6a is a schematic diagram showing some components of a first network node.

FIG. 6a is a schematic diagram illustrating functional modules of the first network node 12. The modules can be implemented using hardware and/or software such as computer program executing in the first network node 12. All modules depend on an execution environment which utilizes the components shown in FIG. 6b. The modules correspond to the steps of the method illustrated in FIG. 3.

In FIG. 6a, a receiving circuitry 60 is configured to receive a Multimedia Message from a first terminal 10.

A processing circuitry 62 is configured to divide the received Multimedia Message into a first part and at least one additional part and to add to the first part a reference to the at least one additional part.

A transmitting circuitry 64 is configured to send the first part to the at least one second terminal 14, and to send the at least one additional part to the at least one second terminal 14, when requested by each of the at least one second terminals 14.

According to another embodiment, the processing circuitry 62 is further configured to store the at least one additional part in the first network node 12.

According to another embodiment, the processing circuitry 62 is further configured to charge a subscription of each of the at least one second terminal 14 for the sending of the at least one additional part.

According to another embodiment, the processing circuitry 62 is further configured to send the at least one additional part, based on the capabilities and the available bandwidth of the at least one second terminal 14.

Figure 6B:
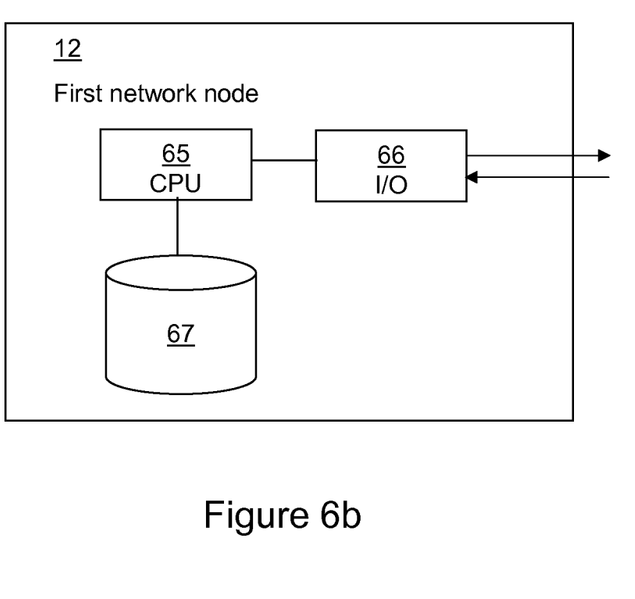

FIG. 6b is a schematic diagram illustrating some components of the first network node 12.

The first network node 12 can be any suitable computer capable of performing the tasks as described herein. For example, the first network node 12 can be a computer running an operating system such as Linux, Microsoft Windows, Apple Mac OS X, UNIX variants, etc.

A central processing unit (CPU) 65 is provided, capable of executing software instructions stored in a memory 67, the memory 67 can be any combination of read and write memory (RAM) and read only memory (ROM). The memory also comprises persistent storage, which, for example, can be any single one or combination of magnetic memory, optical memory, or solid state memory or even remotely mounted memory.

The first network node 12 also comprises an I/O interface 66 for communicating with the first terminal 10, the second network node 13 and the at least one second terminal 14.

Figure 7A:
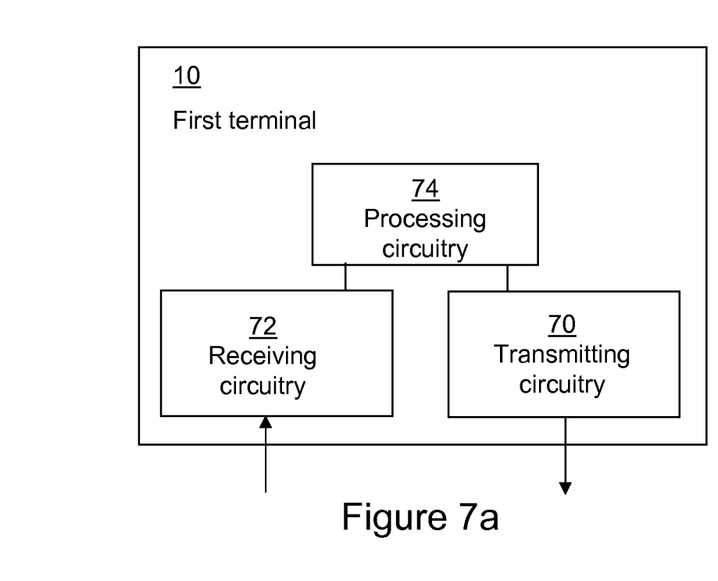
FIG. 7a is a schematic diagram showing some components of a first terminal.

FIG. 7a is a schematic diagram illustrating functional modules of the first terminal 10. The modules can be implemented using hardware and/or software such as computer program executing in the first terminal 10. All modules depend on an execution environment which utilizes the components shown in FIG. 7b. The modules correspond to the steps of the method illustrated in FIG. 4.

The first terminal 10 comprises a transmitting circuitry 70 and a processing circuitry. The processing circuitry is configured to send an alerting message to the first network node 12, the alerting message indicates that the Multimedia Message exceeds the maximum allowed size defined in a subscription rule of the first terminal.

Figure 7B:
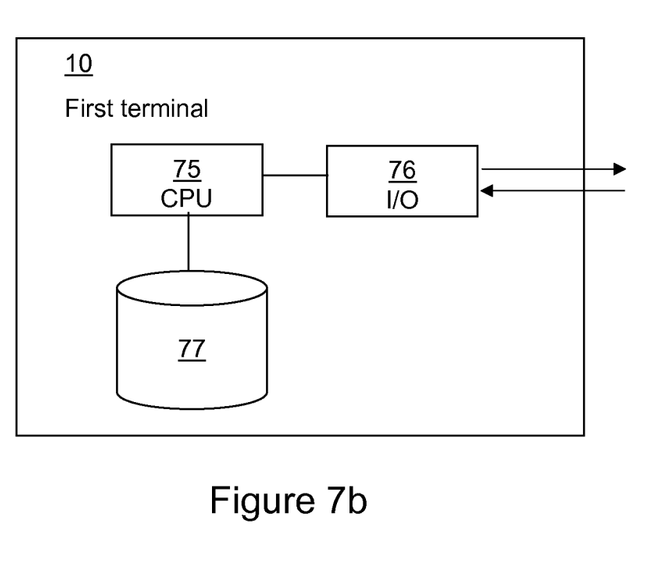

FIG. 7b is a schematic diagram illustrating some components of the first terminal 10.

The first terminal 10 can be any suitable computer capable of performing the tasks as described herein. For example, the first terminal 10 can be a computer running an operating system such as Linux, Microsoft Windows, Apple Mac OS X, UNIX variants, etc.

A central processing unit (CPU) 75 is provided, capable of executing software instructions stored in a memory 77. The memory 77 can be any combination of read and write memory (RAM) and read only memory (ROM). The memory also comprises persistent storage, which, for example, can be any single one or combination of magnetic memory, optical memory, or solid state memory or even remotely mounted memory.

The first terminal 10 also comprises an I/O interface 76 for communicating with the first network node 12, the second network node 13 and the at least one second terminal 14.

Figure 8A:
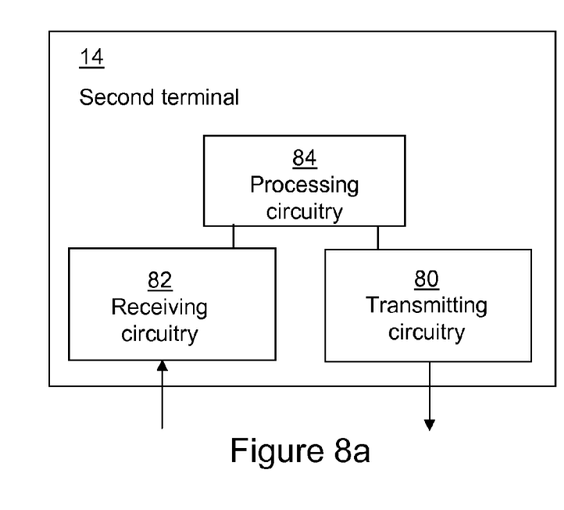
FIG. 8a is a schematic diagram showing some components of a second terminal.
Figure 8B:
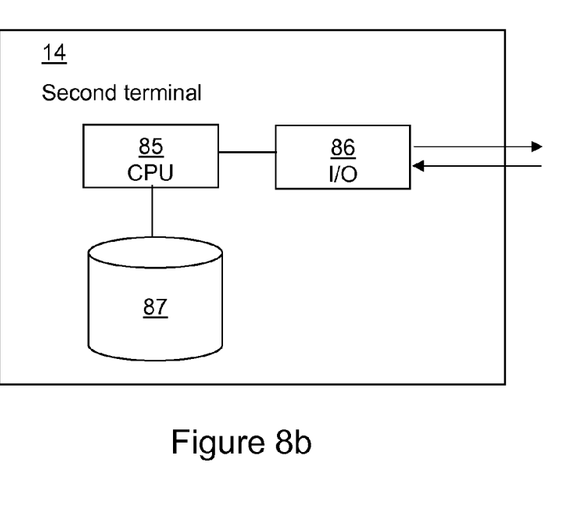

FIG. 8a is a schematic diagram illustrating functional modules of the second terminal 14. The modules can be implemented using hardware and/or software such as computer program executing in the second terminal 14. All modules depend on an execution environment which utilizes the components shown in FIG. 8b. The modules correspond to the steps of the method illustrated in FIG. 5.

The second terminal 14 comprises a receiving circuitry 82, transmitting circuitry 80 and a processing circuitry 84. The processing circuitry 84 is configured to receive from the first network node 12 a first part of the Multimedia Message, the first part comprises a reference to at least one additional part of the Multimedia Message. The processing circuitry 84 is further configured to request the at least one additional part from the first network node 12, the request comprises the reference to the at least one additional part, the available bandwidth and the capabilities of the second terminal. The processing circuitry 84 is further configured to receive the at least one additional part.

Figure 9:
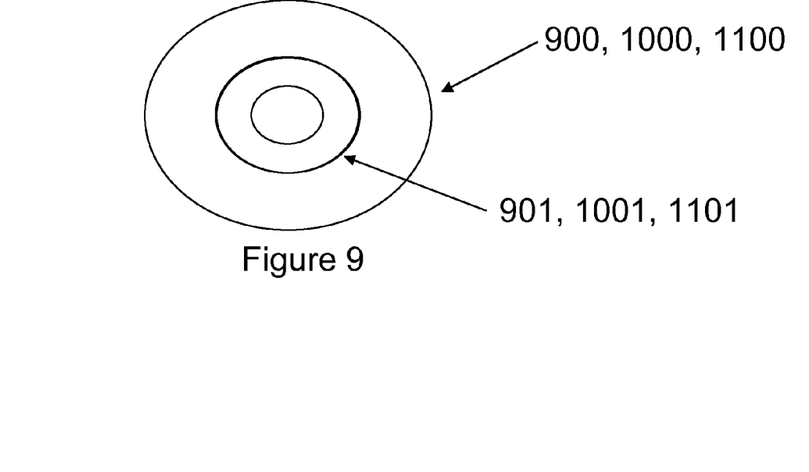
FIG. 9 shows one exemplary computer program product comprising computer readable means for performing a method in a first network node a method in a first terminal and a method in a second terminal.

FIG. 9 shows one example of a computer program product 900, 1000, 1100 comprising computer readable means. On this computer readable means a computer program 901, 1001, 1101 can be stored, which computer program can cause a controller to execute a method according to embodiments described herein, e.g. in connection with the FIGS. 3, 4 and 5. In this example, the computer program product is an optical disc, such as a CD (compact disc) or a DVD (digital versatile disc) or a Blu-Ray disc. As explained above, the computer program product could also be embodied as a memory of a device, such as memory 67 of the first network node 12, memory 77 of the first terminal 10 or memory 87 of the second terminal 14. While the computer program 901, 1001, 1101 is here schematically shown as a track on the depicted optical disk, the computer program can be stored in any way which is suitable for the computer program product.

It is an advantage with the embodiments to provide a mechanism for the end users to send large Multimedia Messages, such as large MMS files. Other examples could be large IMS (IP Multimedia Subsystem) files.

However, the above mentioned and described embodiments are only given as examples and should not be limiting to the present invention. Other solutions, uses, and functions within the scope of the invention as claimed in the accompanying patent claims should be apparent for the person skilled in the art.

The invention claimed is:

1. A method in a first network node of a communication network for sending a Multimedia Message, to at least one second terminal, the Multimedia Message being received from a first terminal, the method comprising:
receiving, by the first network node, an alerting message from the first terminal, the alerting message comprising an indication that the Multimedia Message size exceeds a maximum allowed size defined in a subscription rule of the first terminal;
dividing, by the first network node, the Multimedia Message into a first part and at least one additional part;
adding, by the first network node, only to the first part, a reference to the at least one additional part;
sending, by the first network node, the first part to the at least one second terminal, wherein the at least one second terminal initiates to play the first part, to decide whether to download or stream the at least one additional part, and to refrain from obtaining the at least one additional part;
receiving, by the first network node from the at least one second terminal, a request for the at least one additional part, wherein the request comprises the reference to the at least one additional part, an available bandwidth, and capabilities of the at least one second terminal; and
sending, by the first network node, the at least one additional part to the at least one second terminal, when requested by the at least one second terminal,
wherein sending the at least one additional part further comprises sending the at least one additional part based on the capabilities and the available bandwidth of the at least one second terminal.

2. The method of claim 1, wherein sending the at least one additional part to the at least one second terminal comprises the at least one second terminal downloading or streaming the at least one additional part from the first network node.

3. The method of claim 1, wherein dividing the Multimedia Message into the first part and the at least one additional part further comprises storing the at least one additional part in the first network node.

4. The method of claim 1, wherein:
the first terminal belongs to a first operator and the at least one second terminal belongs to a second operator, the first part being sent to the at least one second terminal via a second network node, the second network node belonging to the second operator.

5. The method of claim 1, wherein the Multimedia Message is in the format of a Multimedia Messaging Service (MMS).

6. A non-transitory computer-readable medium comprising, stored thereupon, a computer program comprising computer readable code that, when run on a first network node, causes the network node to perform the method of claim 1.

7. The method of claim 1, wherein the alerting message is received by the first network node along with the Multimedia Message from the first terminal.

8. The method of claim 1, wherein the Multimedia Message is divided into the first part and the at least one additional part in response to receiving the alerting message.

9. A method in a first terminal of a communication network for sending a Multimedia Message to at least one second terminal, the Multimedia Message being sent via a first network node, the method comprising:
sending, from the first terminal, an alerting message to the first network node, the alerting message comprising an indication that the Multimedia Message size exceeds a maximum allowed size defined in a subscription rule of the first terminal, causing the first network node to divide the Multimedia Message into a first part and at least one additional part, to send the first part to the at least one second terminal, wherein the at least one second terminal initiates to play the first part, to decide whether to download or stream the at least one additional part, and to refrain from obtaining the at least one additional part, and to receive, from the at least one second terminal, a request for the at least one additional part, wherein the request comprises a reference to the at least one additional part, an available bandwidth, and capabilities of the at least one second terminal, wherein only the first part comprises the reference to the at least one additional part, and wherein the first network node sends the at least one additional part to the at least one second terminal based on the capabilities and the available bandwidth of the at least one second terminal.

10. A non-transitory computer-readable medium comprising, stored thereupon, a computer program comprising computer readable code that, when run on a first terminal, causes the first terminal to perform the method of claim 9.

11. A method in a second terminal of a communication network for receiving a Multimedia Message from a first terminal via a first network node, the method comprising:
receiving, from the first network node, a first part of the Multimedia Message, wherein only the first part comprises a reference to an at least one additional part of the Multimedia Message, the Multimedia Message being divided into the first part and the at least one additional part by the first network node in response to receiving an alerting message from the first terminal, the alerting message comprising an indication that the Multimedia Message size exceeds a maximum allowed size defined in a subscription rule of the first terminal, and wherein the second terminal initiates to play the first part, to decide whether to download or stream the at least one additional part, and to refrain from obtaining the at least one additional part;
requesting the at least one additional part from the first network node, wherein the request comprises a reference to the at least one additional part, an available bandwidth and capabilities of the second terminal; and
receiving the at least one additional part,
wherein the first network node sends the at least one additional part to the second terminal based on the capabilities and the available bandwidth of the second terminal.

12. The method of claim 11, wherein a maximum allowed size of the received first part is defined in a subscription rule of the first terminal.

13. The method of claim 11, wherein receiving the at least one additional part comprises downloading or streaming the at least one additional part from the first network node.

14. The method of claim 11, wherein:
the first terminal belongs to a first operator and the second terminal belongs to a second operator, the second terminal receiving the first part from the first network node via a second network node, the second network node belonging to the second operator.

15. A non-transitory computer-readable medium comprising, stored thereupon, a computer program comprising computer readable code that, when run on a second terminal, causes the second terminal to perform a method as claimed in claim 11.

16. A first network node connectable to a communication network, and arranged to send a Multimedia Message to at least one second terminal, the first network node comprising:
a receiving circuitry configured to:
receive an alerting message from a first terminal, the alerting message comprising an indication that the Multimedia Message size exceeds a maximum allowed size defined in a subscription rule of the first terminal,
receive the Multimedia Message from the first terminal, and
receive, from the at least one second terminal, a request for at least one additional part, wherein the request comprises a reference to the at least one additional part, an available bandwidth, and capabilities of the at least one second terminal;
a processor circuitry configured to:
divide the Multimedia Message into a first part and the at least one additional part, and
add only to the first part the reference to the at least one additional part; and
a transmitting circuitry configured to:
send the first part to the at least one second terminal, wherein the at least one second terminal initiates to play the first part, to decide whether to download or stream the at least one additional part, and to refrain from obtaining the at least one additional part, and
send the at least one additional part to the at least one second terminal, when requested by the at least one second terminal,
wherein the transmitting circuitry is further configured to send the at least one additional part, based on the capabilities and the available bandwidth of the at least one second terminal.

17. The first network node of claim 16, wherein the processing circuitry is further configured to store the at least one additional part in the first network node.

18. The first network node of claim 16, wherein:
the first terminal belongs to a first operator and the at least one second terminal belongs to a second operator, and the transmitting circuitry is configured to send the first part to the at least one second terminal via a second network node, the second network belonging to the second operator.

19. The network node of claim 16, wherein the processing circuitry is further configured to charge a subscription of each of the at least one second terminal for the sending of the at least one additional part.

20. The first network node of claim 16, wherein the receiving circuitry is configured to receive the alerting message along with the Multimedia Message from the first terminal.

21. The first network node of claim 16, wherein the processor circuitry is configured to divide the Multimedia Message into the first part and the at least one additional part in response to the receiving circuitry receiving the alerting message.

22. A first terminal connectable to a communication network, and arranged to send a Multimedia Message to at least one second terminal, the Multimedia Message being sent via a first network node, the first terminal comprising a transmitting circuitry and a processing circuitry, the processing circuitry being configured to:
send an alerting message to the first network node, the alerting message comprising an indication that the Multimedia Message size exceeds a maximum allowed size defined in a subscription rule of the first terminal, causing the first network node to divide the Multimedia Message into a first part and at least one additional part, to send the first part to the at least one second terminal, wherein the at least one second terminal initiates to play the first part, to decide whether to download or stream the at least one additional part, and to refrain from obtaining the at least one additional part, and to receive, from the at least one second terminal, a request for the at least one additional part, wherein the request comprises a reference to the at least one additional part, an available bandwidth, and capabilities of the second terminal, wherein only the first part comprises the reference to the at least one additional part, and wherein the first network node sends the at least one additional part to the at least one second terminal based on the capabilities and the available bandwidth of the at least one second terminal.

23. A second terminal connectable to a communication network and arranged to receive a Multimedia Message from a first terminal via a first network node, the second terminal comprising a receiving circuitry, a transmitting circuitry, and a processing circuitry, the processing circuitry being configured to:

receive from the first network node, using the receiving circuitry, a first part of the Multimedia Message, wherein only the first part comprises a reference to at least one additional part of the Multimedia Message, the Multimedia Message being divided into the first part and the at least one additional part by the first network node in response to the first network node receiving an alerting message from the first terminal, the alerting message comprising an indication that the Multimedia Message size exceeds a maximum allowed size defined in a subscription rule of the first terminal, wherein the second terminal initiates to play the first part, to decide whether to download or stream the at least one additional part, and to refrain from obtaining the at least one additional part;

request, using the transmitting circuitry, the at least one additional part from the first network node, wherein the request comprises a reference to the at least one additional part, an available bandwidth and capabilities of the second terminal; and receive, using the receiving circuitry, the at least one additional part, wherein the first network node sends the at least one additional part to the second terminal based on the capabilities and the available bandwidth of the second terminal.

24. The second terminal of claim 23, wherein a maximum allowed size of a received first part is defined in a subscription rule of the first terminal.

25. The second terminal of claim 23, wherein the receiving circuitry is configured to receive the at least one additional part by downloading or streaming the at least one additional part from the first network node.

26. The second terminal of claim 23, wherein the first terminal belongs to a first operator and the second terminal belongs to a second operator, and the receiving circuitry is further configured to receive the first part from the first network node via a second network node, the second network node belonging to the second operator.

* * * * *